(12) United States Patent
Saeki et al.

(10) Patent No.: US 10,614,678 B2
(45) Date of Patent: Apr. 7, 2020

(54) CONTROL DEVICE, ELECTRONIC DEVICE AND CONTROL SYSTEM

(71) Applicant: FANUC CORPORATION, Minamitsuru-gun, Yamanashi (JP)

(72) Inventors: Masahiro Saeki, Yamanashi (JP); Kenichiro Kurihara, Yamanashi (JP); Hitoshi Izumi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 8 days.

(21) Appl. No.: 16/197,717

(22) Filed: Nov. 21, 2018

(65) Prior Publication Data
US 2019/0164393 A1    May 30, 2019

(30) Foreign Application Priority Data
Nov. 24, 2017    (JP) .................................. 2017-225684

(51) Int. Cl.
*H04B 10/116*    (2013.01)
*G08B 5/36*    (2006.01)
(Continued)

(52) U.S. Cl.
CPC .............. *G08B 5/36* (2013.01); *H04B 10/114* (2013.01); *H04B 10/116* (2013.01); *H04B 10/11* (2013.01);
(Continued)

(58) Field of Classification Search
CPC ...... G08B 5/36; H04B 10/116; H04B 10/114; H04B 10/50; H04B 10/516; H04B 10/11; H05B 33/08
(Continued)

(56) References Cited

U.S. PATENT DOCUMENTS 6,548,967 B1 *    4/2003    Dowling ............ G06Q 30/0201
                                                                  315/318
8,253,353 B2 *    8/2012    Baggen .............. H04B 10/1141
                                                                  315/247
(Continued)

FOREIGN PATENT DOCUMENTS

JP    2004-248128    9/2004
JP    2007-60096    3/2007
(Continued)

OTHER PUBLICATIONS

Notification of Reasons for Refusal dated Jul. 30, 2019 in corresponding Japanese Patent Application No. 2017-225684.

*Primary Examiner* — Dibson J Sanchez
(74) *Attorney, Agent, or Firm* — Wenderoth, Lind & Ponack L.L.P.

(57) ABSTRACT

A storage unit stores first information on at least one of a machine tool and a peripheral device of the machine tool. A control unit includes a generation unit configured to generate a first light emitting pattern which is recognizable to human eyes and which includes a lighting-on state, a lighting-off state, or a lighting-on/off state of a light emitting element, a modulation unit configured to modulate the first information into a light communication signal based on lighting-on/off of the light emitting element unrecognizable to human eyes but recognizable to an electronic device, a superimposition unit configured to superimpose the light communication signal on the first light emitting pattern, thereby generating a second light emitting pattern including the light communication signal, and a light emitting element control unit configured to control the light emitting element on a basis of the second light emitting pattern generated by the superimposition unit.

20 Claims, 11 Drawing Sheets

(51) Int. Cl.
*H04B 10/114* (2013.01)
*H04B 10/11* (2013.01)
*H04B 10/50* (2013.01)
*H04B 10/516* (2013.01)
*H05B 33/08* (2020.01)

(52) U.S. Cl.
CPC ............ *H04B 10/50* (2013.01); *H04B 10/516* (2013.01); *H05B 33/08* (2013.01)

(58) Field of Classification Search
USPC ................ 398/106–114, 118–131, 140–172, 398/182–201
See application file for complete search history.

(56) References Cited

U.S. PATENT DOCUMENTS

| | | | | |
|---|---|---|---|---|
| 8,401,394 B2* | 3/2013 | Walewski | ............ | H04B 10/116 398/130 |
| 8,588,616 B2* | 11/2013 | Langer | ................ | H04B 10/116 139/191 |
| 8,744,273 B2* | 6/2014 | Riedl | ...................... | G08C 23/04 398/130 |
| 2006/0239689 A1* | 10/2006 | Ashdown | ........... | H04B 10/1141 398/130 |
| 2007/0092264 A1* | 4/2007 | Suzuki | ............... | H04B 10/1141 398/189 |
| 2009/0022112 A1* | 1/2009 | Shin | .................. | H04B 10/1149 370/336 |
| 2009/0196613 A1* | 8/2009 | Linnartz | ................ | H04B 10/11 398/78 |
| 2009/0208221 A1* | 8/2009 | Sasai | ...................... | H04B 1/707 398/130 |
| 2009/0214225 A1* | 8/2009 | Nakagawa | ......... | H04B 10/1149 398/191 |
| 2010/0111538 A1* | 5/2010 | Arita | ...................... | H04B 3/54 398/130 |
| 2010/0135669 A1* | 6/2010 | Kim | .................. | H04B 10/1141 398/130 |
| 2011/0018465 A1* | 1/2011 | Ashdown | ........... | H05B 33/0818 315/294 |
| 2011/0064416 A1* | 3/2011 | Rajagopal, Sr. | ... | H04B 10/1149 398/130 |
| 2011/0069965 A1* | 3/2011 | Kim | .................. | H04B 10/1149 398/130 |
| 2012/0045221 A1* | 2/2012 | Walewski | .......... | H04B 10/1141 398/191 |
| 2012/0087676 A1* | 4/2012 | Lim | ..................... | H04B 10/116 398/182 |
| 2012/0087677 A1* | 4/2012 | Jang | ..................... | H04B 10/116 398/183 |
| 2012/0257901 A1* | 10/2012 | Yamada | ................ | H04B 10/114 398/130 |
| 2013/0004182 A1* | 1/2013 | Kim | ..................... | H04B 10/116 398/118 |
| 2013/0015784 A1* | 1/2013 | Kamada | ................ | H04B 10/116 315/297 |
| 2013/0202310 A1* | 8/2013 | Rietman | ............ | H05B 37/0272 398/128 |
| 2013/0336659 A1* | 12/2013 | Dutta | ...................... | H04B 10/11 398/98 |
| 2014/0010540 A1* | 1/2014 | Jeong | ................... | H04B 10/116 398/66 |
| 2014/0072310 A1* | 3/2014 | Yang | .................. | H05B 33/0845 398/118 |
| 2014/0321859 A1* | 10/2014 | Guo | ..................... | H04B 10/116 398/118 |
| 2014/0321860 A1* | 10/2014 | Kido | .................. | H04B 10/116 398/118 |
| 2015/0015156 A1* | 1/2015 | Angelin | ............. | H05B 33/0851 315/210 |
| 2015/0016825 A1* | 1/2015 | Haruyama | ........... | H04B 10/116 398/118 |
| 2015/0145417 A1* | 5/2015 | Woelfing | ........... | H05B 33/0851 315/151 |
| 2016/0047890 A1* | 2/2016 | Ryan | .................. | H05B 33/0845 398/118 |
| 2016/0099773 A1* | 4/2016 | Raj | ..................... | H04B 10/116 398/118 |
| 2016/0134366 A1* | 5/2016 | Elgala | .................. | H04B 10/116 398/130 |
| 2017/0041069 A1* | 2/2017 | Jeong | ................... | H04B 10/116 |
| 2017/0078026 A1* | 3/2017 | Brilman | ............... | H04B 10/116 |
| 2017/0099103 A1* | 4/2017 | Jang | ................... | H04B 10/116 |
| 2017/0295627 A1* | 10/2017 | Lo | ...................... | H05B 33/0854 |

FOREIGN PATENT DOCUMENTS

| | | |
|---|---|---|
| JP | 2008-283446 | 11/2008 |
| JP | 2013-026691 | 2/2013 |
| JP | 2017-135184 | 8/2017 |

* cited by examiner

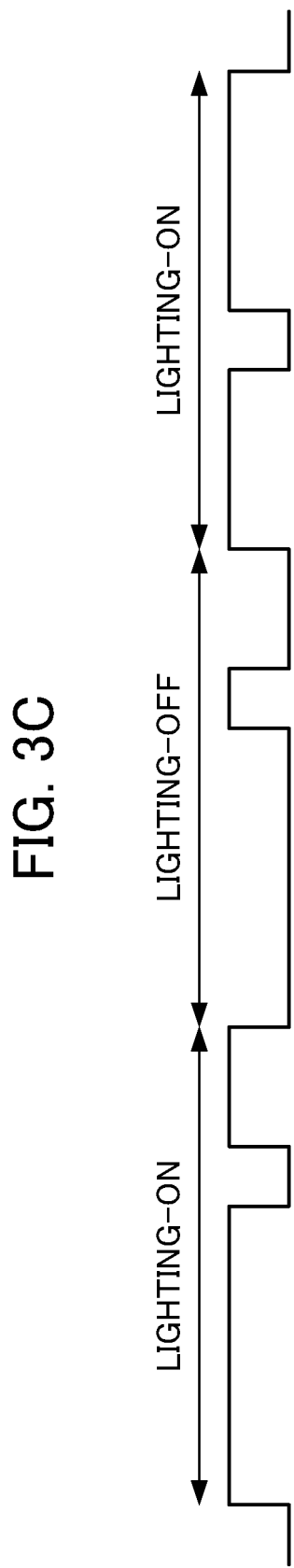

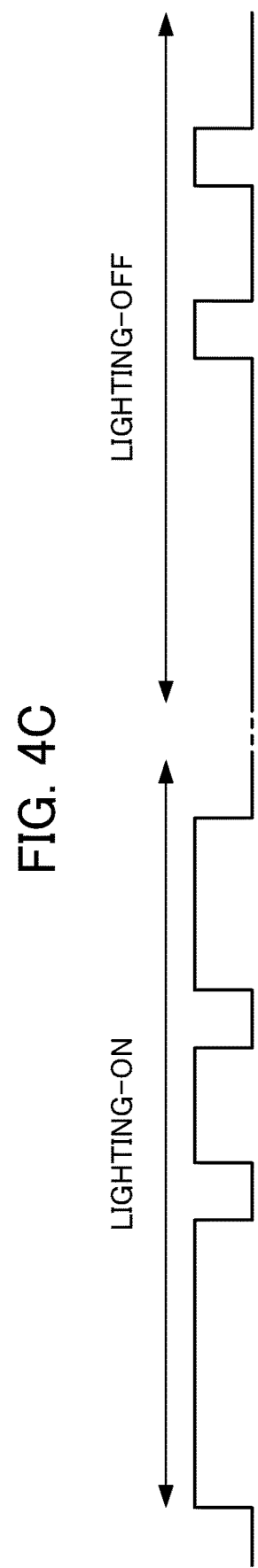

CONTROL DEVICE, ELECTRONIC DEVICE AND CONTROL SYSTEM

This application is based on and claims the benefit of priority from Japanese Patent Application. No. 2017-225684, filed on 24 Nov. 2017, the content of which is incorporated herein by reference.

BACKGROUND OF THE INVENTION

Field of the Invention

The present invention relates to a control device, an electronic device and a control system.

Related Art

A conventional machine tool is configured to perform notification of alarm information and the like via a display unit such as a monitor of a control device. In the case of an I/O device which is able to be distributedly disposed and configured as a monitor of a control device and/or an I/O device to be used for a large machine tool, such an I/O device may not be disposed in the vicinity of an operator, resulting in poor maintainability. In the first place, a machine tool such as a line machine directly or indirectly having no display unit from the first is not capable of giving a notification of alarm information via a display unit, and the maintainability thereof is thus poor. A display unit is newly added to such a machine tool so as to be disposed in a vicinity of an operator, thereby enabling to improve the maintainability thereof. On the other hand, the addition incurs additional costs, resulting in increase in cost of the machine tool.

A machine tool is able to notify an operator of simple alarm information or the like with a light emitting pattern (for example, a predetermined lighting-on/off pattern) recognizable to human eyes, by using, for example, a chip LED or a seven-segment LED instead of a display unit such as a monitor. On the other hand, such a machine tool hardly notifies an operator of detailed contents of the alarm and/or a restoration method.

To deal with the problem, for example, Patent Document 1 discloses that the technique (so-called visible light communication) in which a semiconductor light emitting element such as an LED or the like used in display means for directly and visually notifying a person of the operating state of a device or the like with light is used also for communication between devices is used to transmit to other devices various types of information, for example, a state of a device covered by a meter, a value indicated by a meter, and manuals of a measuring device and a control device provided with a meter. More specifically, an LED is subjected to high-speed-on/off control or modulation control with respect to the amount of light emission on the basis of the bit information included in detailed information, thereby performing visible light communication with the LED looking as if continuously lighting to human eyes (that is, while maintaining the LED in a lighting-on state).

Patent Document 2 discloses a printer control system in which a pulse generation device controls the on/off of an LED in a set period, and also performs, while the LED is in a lighting-on state, switching of the LED at a high speed while referring to the transmission data stored in a line buffer, thereby modulating a data stream included in audio data to perform visible light communication. FIG. 10 is a diagram illustrating relation between a pulse signal of an LED on/off signal and transmission data to be transmitted in the on period of the LED, in the technique according to Patent Document 2. As shown in FIG. 10, also in the invention described in Patent Document 2, the amount of light emission of the LED is controlled at a high speed while the LED is in a lighting-on state, thereby performing visible light communication with the LED looking as if continuously lighting to human eyes (that is, while maintaining the LED in a lighting-on state).

Patent Document 1: Japanese Unexamined Patent Application, Publication No. 2004-248128

Patent Document 2: Japanese Unexamined Patent Application, Publication No. 2007-60096

SUMMARY OF THE INVENTION

In each of the techniques disclosed in Patent Document 1 and Patent Document 2, such visible light communication is performed only while an LED is in a lighting-on state, and is not performed while the LED is in a lighting-off state.

The purpose of the present invention is to provide a control device which is capable of performing visible light communication not only while an LED is in a lighting-on state but also while an LED is in a lighting-off state, thereby enabling to transmit data in a shorter time as compared with prior art and to efficiently utilize power of the LED.

(1) A control device (for example, a control device 10 to be described below) according to the present invention controls at least one of a machine tool and a peripheral device of the machine tool, and includes a storage unit (for example, a storage unit 110 to be described below), a control unit (for example, a control unit 100 to be described below), and a light emitting element (for example, a light emitting element 120 to be described below). The storage unit stores first information on at least one of the machine tool and the peripheral device. The control unit includes a generation unit (for example, a generation unit 101 to be described below) configured to generate a first light emitting pattern which is recognizable to human eyes and includes a lighting-on state, a lighting-off state, or a lighting-on/off state of the light emitting element indicating an operating state of at least one of the machine tool and the peripheral device, a modulation unit (for example, a modulation unit 102 to be described below) configured to convert the first information into a light communication signal which is based on lighting-on/off of the light emitting element and is unrecognizable to human eyes but recognizable to an electronic device, a superimposition unit (for example, a superimposition unit 103 to be described below) configured to superimpose the light communication signal on the first light emitting pattern, thereby generating a second light emitting pattern including the light communication signal while maintaining the first light emitting pattern recognizable to human eyes, and a light emitting element control unit (for example, a light emitting element control unit 104 to be described below) configured to control the light emitting element on a basis of the second light emitting pattern generated by the superimposition unit.

(2) In the control device according to (1), each of a lighting-on unit and a lighting-off unit of the light emitting element (for example, the light emitting element 120 to be described below) in the first light emitting pattern may be configured with n pieces of light emission pulses, wherein the n is a predetermined integer of 8 or bigger. In the light communication signal, when the light emitting element is in the lighting-on state including at least one lighting-on unit in the first light emitting pattern, first m pieces and last m pieces of the light emission pulses may be set to be on in the lighting-on unit, the remaining light emission pulses except one light emission pulse may be ail set to be on, and only the excepted one light emission pulse may be set to be off, wherein the m is an integer of 2 or bigger. While when the light emitting element is in the lighting-off state including at least one lighting-off unit in the first light emitting pattern, the first m pieces and the last m pieces of the light emission pulses may be set to be off in the lighting-off unit, the remaining light emission pulses except one light emission pulse may be all set to be off, and only the excepted one light emission pulse may be set to be on.

(3) In the control device according to (1), each of a lighting-on unit and a lighting-off unit of the light emitting element (for example, the light emitting element 120 to be described below) in the first light emitting pattern may be configured with n pieces of light emission pulses, wherein the n is a predetermined integer of 3 or bigger. In the light communication signal, when the light emitting element is in the lighting-on state including at least one lighting-on unit in the first light emitting pattern, the light emission pulses except one light emission pulse included in the lighting-on unit may be all set to be on, and only the excepted one light emission pulse may be set to be off or on. While when the light emitting element is in the lighting-off state including at least one lighting-off unit in the first light emitting pattern, the light emission pulses except one light emission pulse included in the lighting-off unit may be all set to be off, and only the excepted one light emission pulse may be set to be on or off.

(4) The control device according to any one of (1) to (3) may include an external interface (for example, an interface unit 130 to be described below). The control unit (for example, the control unit 100 to be described below) may further include an update unit (for example, an update unit 105 to be described below) configured to perform at least one of addition and updating of the first information stored in the storage unit (for example, the storage unit 110 to be described below), on a basis of information received via the external interface.

(5) In the control device according to (4), the external interface may receive the information from an external storage device (for example, a storage device 50 to be described below) existing on a cloud or a fog.

(6) In the control device according to any one of (1) to (5), the first information may be detailed information on the state of at least one of the machine tool and the peripheral device of the machine tool, and may include at least one of alarm information, a countermeasure and a manual.

(7) An electronic device (for example, an electronic device 20 to be described below) according to the present invention includes a light sensing unit (for example, a light sensing unit 200 to be described below) and a control unit (for example, a control unit 210 to be described below). The control unit includes a light emitting pattern acquisition unit (for example, a light emitting pattern acquisition unit 211 to be described below) configured to acquire the second light emitting pattern output by the control device according to any one of (1) to (6), via the light sensing unit, a signal separation unit (for example, a signal separation unit 212 to be described below) configured to separate the light communication signal from the second light emitting pattern acquired by the light emitting pattern acquisition unit, a signal demodulation unit (for example, a signal demodulation unit 213 to be described below) configured to demodulate the light communication signal, thereby generating the first information, and a notification unit (for example, a notification unit 214 to be described below) configured to notify a user of the first information.

(8) A control system (for example, a control system 1 to be described below) according to the present invention includes the control device according to any one of (1) to (6) and the electronic device according to (7).

(9) in the control system according to (8), the modulation unit (for example, the modulation unit 102 to be described below) included in the control device may convert the first information into the light communication signal according to a notification method performed by the notification unit (for example, the notification unit 214 to be described below) included in the electronic device.

(10) In the control device according to any one of (1) to (5), the first information may be a tag, the tag may be identification data corresponding to detailed information on the state of at least one of the machine tool and the peripheral device of the machine tool, and the detailed information may include at least one of alarm information, a countermeasure, and a manual.

(11) An electronic device according to the present invention includes a light sensing unit (for example, a light sensing unit 200 to be described below), a control unit (for example, a control unit 210 to be described below), and a storage unit (for example, a storage unit 240 to be described below). The storage unit stores correspondence relation between detailed information on a state of at least one of a machine tool and a peripheral device of the machine tool and a tag corresponding to the detailed information. The control unit includes a light emitting pattern acquisition unit (for example, a light emitting pattern acquisition unit 211 to be described below) configured to acquire the second light emitting pattern output by the control device according to (10), via the light sensing unit, a signal separation unit (for example, a signal separation unit 212 to be described below) configured to separate the light communication signal from the second light emitting pattern acquired by the light emitting pattern acquisition unit, a signal demodulation unit (for example, a signal demodulation unit 213 to be described below) configured to demodulate the light communication signal, thereby generating the first information, a detailed information generation unit (for example, detailed information generation unit 215 to be described below) configured to generate the detailed information for the tag serving as the first information, by use of the correspondence relation, and a notification unit (for example, a notification unit 214 to be described below) configured to notify a user of the detailed information.

(12) A control system according to the present invention includes the control device according to (10), and the electronic device according to (11).

The present invention enables to perform visible light communication not only while an LED is in a lighting-on state but also while the LED is in a lighting-off state, thereby enabling to transmit data in a shorter time as compared with prior art and to efficiently utilize power of the LED.

BRIEF DESCRIPTION OF THE DRAWINGS

FIG. 3C is another diagram illustrating the light emitting pattern according to the first embodiment of the present invention.

FIG. 4C is another diagram illustrating the light emitting pattern according to the first embodiment of the present invention.

DETAILED DESCRIPTION OF THE INVENTION

First Embodiment

The first embodiment of the present invention is described in detail with reference to FIG. 1 to FIG. 5.

Control System

Figure 1:
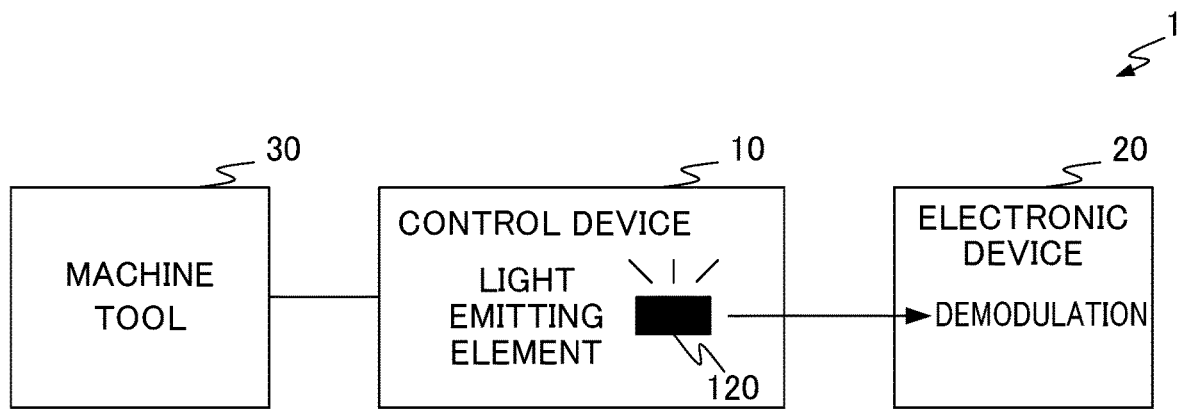
FIG. 1 is a diagram illustrating an overall configuration of a control system according to a first embodiment of the present invention.

FIG. 1 shows the overall configuration of a control system 1 according to the first embodiment of the present invention. As shown in FIG. 1, the control system 1 includes a control device 10, an electronic device 20 and a machine tool 30.

The control device 10, which is a device for controlling the machine tool 30, transmits a control signal to the machine tool 30, thereby performing control so that the machine tool 30 performs predetermined processing. The control device 10 is, for example, a numerical controller (CNC). The control device 10 acquires from the machine tool 30 the information on the normal operating state and the information on the abnormal state of the machine tool 30 and/or the peripheral devices thereof, and selects the detailed information to be transmitted to an operator on the basis of the acquired information. The detailed information herein includes, for example, alarm information, and a countermeasure and a manual at the time of alarm generation. The control device 10 has a light emitting element 120, and generates a light communication signal including an LED lighting-on/off pattern unrecognizable to human eyes but recognizable to the electronic device 20, on the basis of the detailed information to be transmitted to an operator. The control device 10 then generates a second light emitting pattern in such a manner that the light communication signal is superimposed on a first light emitting pattern serving as the LED lighting-on/off pattern which is recognizable to human eyes and expresses the operating state of the machine tool 30 and/or the peripheral devices thereof, thereby performing modulation control for the light emitting element 120 on the basis of the second light emitting pattern. It is noted that although in the above description the control device 10 performs modulation control for the light emitting element 120 on the basis of the detailed information to be transmitted to an operator, this is just one example. Alternatively, the control device 10 may perform modulation control for the light emitting element 120 on the basis of other detailed information. The modulation control method for the light emitting element 120 by the control device 10 will be described in detail below.

The electronic device 20 acquires the second light emitting pattern of the light emitting element 120 controlled by the control device 10, and separates and demodulates the light communication signal superimposed on the first light emitting pattern from the second light emitting pattern, and notifies a user of the detailed information transmitted by the control device 10.

The machine tool 30 is a device for performing predetermined machining such as cutting under the control by the control device 10. The machine tool 30 includes a motor to be driven for machining of a workpiece, a spindle and a feed axis attached to the motor, and jigs, tools and the like corresponding to the respective axes. The machine tool 30 drives the motor on the basis of the operation command output by the control device 10, thereby performing predetermined machining. The type of the predetermined machining herein is not limited particularly. A different type of machining from cutting may be performed, such as grinding, polishing, rolling or forging.

Control Device

Figure 2:
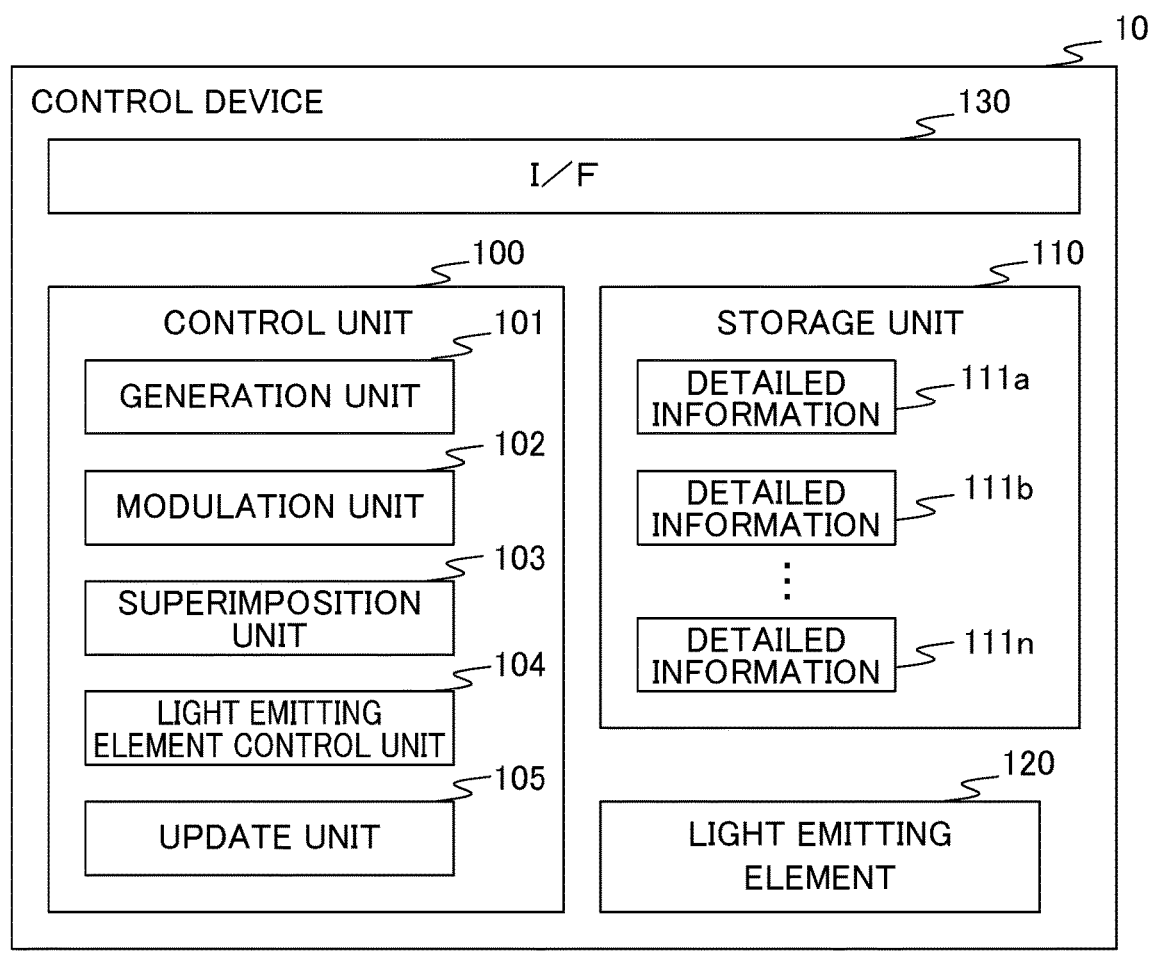
FIG. 2 is a functional block diagram of a control device according to the first embodiment of the present invention.

FIG. 2 is a functional block diagram of the control device 10. The control device 10 includes a control unit 100, a storage unit 110, the light emitting element 120, and an interface unit 130. The control unit 100, which is a unit for controlling the entire control device 10, appropriately reads out various types of programs (collectively referred to as "control device visible light communication control programs") from a storage region such as a ROM, a RAM, a flash memory or a hard disk (HDD), and executes the programs, thereby realizing various types of functions in the present embodiment. The control unit 100 may be a CPU. The control unit 100 includes a generation unit 101, a modulation unit 102, a superimposition unit 103, a light-emitting element control unit 104, and an update unit 105. The detailed functions will be described below, of the generation unit 101, the modulation unit 102, the superimposition unit 103, the light emitting element control unit 104, and the update unit 105. The control unit 100 includes not only the above-described functional units, but also other components included in an ordinary numerical controller in order to numerically control the machine tool 30 and/or the peripheral devices thereof. The illustration and explanation of such other components will be omitted because a person skilled in the art knows well those components.

The storage unit 110 stores various types of detailed information to be transmitted to an operator regarding the normal state or the abnormal state of the machine tool 30 and/or the peripheral devices thereof. In the example shown in FIG. 2, the storage unit 110 stores a detailed information 111a, a detailed information 111b, and to a detailed information 111n, as various types of detailed information. Each of the detailed information 111a to the detailed information 111n may include, for example, alarm information, and/or a countermeasure and/or a manual to the alarm, to be transmitted to an operator regarding the abnormal state of the machine tool 30 and/or the peripheral devices thereof. Each of the detailed information 111a to the detailed information 111n may be of, for example, a text message, audio information, or image information. It is noted that although in the above-description, various types of detailed information of the machine tool 30 and/or the peripheral devices thereof are stored as the detailed information 111a to the detailed information 111n, this is just one example. The present invention is not limited to thereto, and other type of information may be stored.

The light emitting element 120 is, for example, an LED which is brought into a lighting-on state, a lighting-off state, or a lighting-on/off state under the modulation control by the control unit 100. It is noted that "lighting-on" means that the light emitting element 120 continues to be in the lighting-on state for a predetermined period, "lighting-off" means that the light emitting element 120 continues to be in the lighting-off state for a predetermined period, and "lighting-on/off" means the state in which the lighting state is switched between "lighting-on" and "lighting-off" at least once or more in a predetermined period.

The interface unit 130 is the interface through which the control unit 100 acquires from the machine tool 30 the information on the operating state and the information on the abnormality of the machine tool 30 and/or the peripheral devices thereof. It is noted that the interface unit 130 exchanges data with the machine tool 30 and/or the peripheral devices thereof, via a network or directly.

The light communication signal which is the feature of the present invention is described below, and thereafter, the functional units included in the control unit 100 are described.

Light Communication Signal

The light emission pulse of the LED is set to such a lighting-on/off cycle or shorter in which the light emitting element 120 appears to be continuously lit on to human eyes under the lighting-on state, while the light emitting element 120 appears to be continuously lit off or to be lit on at low brightness to human eyes under the lighting-off state (for example, lighting-on/off of 0.03 seconds or shorter, which is approx. 30 times per second). It is noted that in the present invention, the light emitting element 120 is determined to be in "lighting-off state" not only in the case where the light emitting element 120 appears to be continuously lit off to human eyes, but also in the case where the light emitting element 120 appears to be continuously lit on at low brightness. On the other hand, the light emission pulse is set to such a lighting-on/off cycle in which a light receiving element (for example, an image sensor, a photo diode) of the electronic device 20 is able to detect the lighting-on/off (for example, lighting-on/off of 16 microseconds or longer, which is approx. 62,500 times per second). As in the description above, the lighting-on/off cycle of the light emission pulse may be set to any value between 16 microseconds (lighting-on/off of approx. 62,500 times per second) and 0.03 seconds (lighting-on/off of approx. 30 times per second), as an example, but not limited thereto. The lighting-on/off cycle may be set according to the performance of the light receiving element.

First Light Signal

Figure 3A:
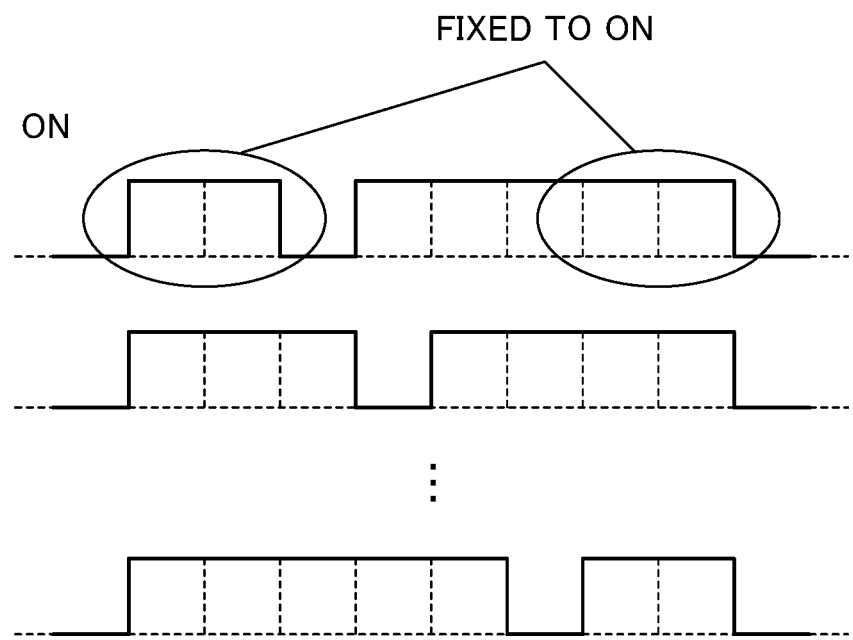
FIG. 3A is a diagram illustrating a light emitting pattern according to the first embodiment of the present invention.
Figure 3B:
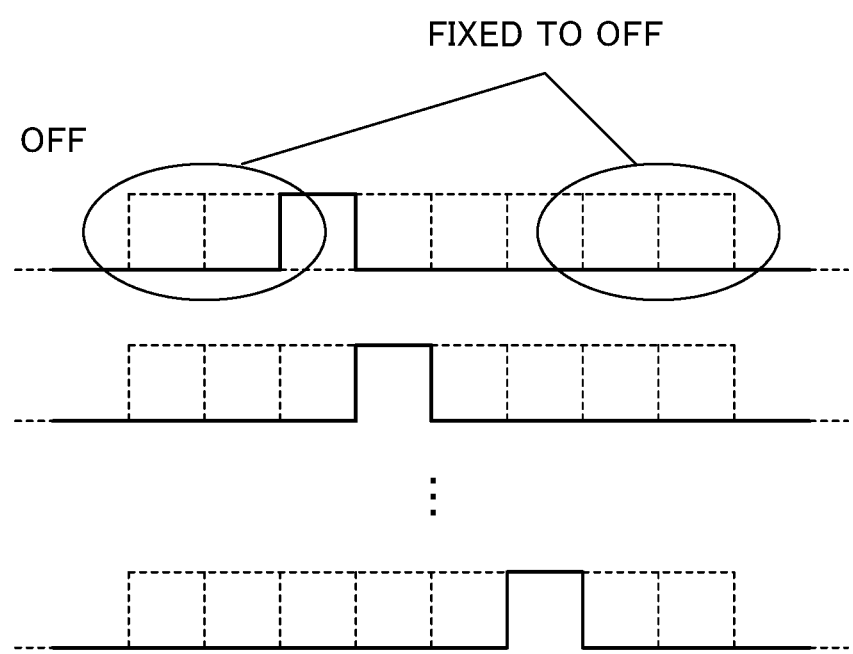
FIG. 3B is another diagram illustrating the light emitting pattern according to the first embodiment of the present invention.

FIG. 3A to FIG. 3C show one example of the light communication signal (hereinafter, referred to as "first light signal") using a light emission pulse by the light emitting element 120. The first light signal includes eight light emission pulses as one set, which is the minimum lighting-on unit or the minimum lighting-off unit in the first light emitting pattern, and which is the minimum unit for expressing data (bit signal) as a light communication signal.

FIG. 3A shows one example of the first light signal in the first light emitting pattern at the time when the light emitting element 120 is in the lighting-on state. In the first light emitting pattern, one lighting-on unit of the light emitting element 120 is configured with eight light emission pulses, and these eight light emission pulses are all on. As a result of the superimposition of the first light signal on the lighting-on unit, the first two light emission pulses and the last two light emission pulses are set to be on out of the eight light omission pulses, while other light emission pulses except one out of the remaining light emission pulses are all on and only the excepted one light emission pulse is set to be off. This enables to express at least four pieces of bit data. The first two light emission pulses and the last two light emission pulses are set to be on as described above, thereby enabling to detect the first light signal in the lighting-on state.

That is, the light communication signal ("the first light signal") in which any one of the third light emission pulse to the sixth light emission pulse counted from the head is set to be off is superimposed on the minimum lighting-on unit in the first light emitting pattern in which the eight light emission pulses are set to be on, thereby generating the second light emitting pattern.

FIG. 3B shows one example of the first light signal in the first light emitting pattern at the time when the light emitting element 120 is in the lighting-off state. In the first light emitting pattern, one lighting-off unit of the light emitting element 120 is configured with eight light emission pulses, and these eight light emission pulses are all off. As a result of the superimposition of the first light signal on the lighting-off unit, the first two light emission pulses and the last two light emission pulses out of the eight light emission pulses are set to be off out of the eight light emission pulses, while other light emission pulses except one out of the remaining light emission pulses are all off and only the excepted one light emission pulse is set to be on. This enables to express at least four pieces of bit data. It is noted that the first two light emission pulses and the last two light emission pulses are set to be off, thereby enabling to detect the first light signal in the lighting-off state.

That is, the light communication signal ("the first light signal") in which any one of the third light emission pulse to the sixth light emission pulse counted from the head is set to be on is superimposed on the minimum lighting-off unit in the first light emitting pattern in which the eight light emission pulses are set to be off, thereby generating the second light emitting pattern. As described above, in the case where a light communication signal ("the first light signal") is configured with eight emission pulses as one set, each light emission pulse is set to be on or off in the configuration, depending on whether the first light emitting pattern is in the lighting-on state or the lighting-off state. With such a configuration, the light communication signal is superimposed on the first light emitting pattern, thereby enabling to generate the second light emitting pattern including the light communication signal while maintaining the first light emitting pattern recognizable to human eyes.

FIG. 3C shows one example of the first light signal, in which the lighting-on unit and the lighting-off unit are repeatedly switched over in the first light emitting pattern.

In the description above, the first light signal includes eight light emission pulses as one set which is the minimum lighting-on unit or the minimum lighting-off unit in the first light emitting pattern, and in each lighting-on unit the first two light emission pulses and the last two light emission pulses are set to be on, while in each lighting-off unit the first two light emission pulses and the last two light emission pulses are set to be off. However, the present invention is not limited thereto. Each of the lighting-on unit and the lighting-off unit may be configured with n pieces of light emission pulses, wherein the n is a predetermined integer of 8 or bigger. Further, the first in pieces and the last in pieces of the light emission pulses may be on in each lighting-on unit, while the first m pieces and the last in pieces of the light emission pulses may be off in each lighting-off unit, wherein the m is an integer of 2 or bigger. In this case, the value of m may correspond to any number smaller than 20% of the value of n, as an example, so as not to give an uncomfortable sense to a user.

Second Light Signal

Figure 4A:
FIG. 4A is a diagram illustrating another light emitting pattern according to the first embodiment of the present invention.
Figure 4B:
FIG. 4B is another diagram illustrating the light emitting pattern according to the first embodiment of the present invention.

FIG. 4A to FIG. 4C show one example of the light communication signal (hereinafter, referred to as "second light signal") using a light emission pulse by the light emitting element 120. The second light signal includes three light emission pulses as one set, which is the minimum lighting-on unit or the minimum lighting-off unit in the first light emitting pattern, and which is the minimum unit expressing data (bit signal) as a light communication signal.

FIG. 4A shows one example of the second light signal in the first light emitting pattern at the time when the light emitting element 120 is in the lighting-on state. In the first light emitting pattern, one lighting-on unit of the light emitting element 120 is configured with three light emission pulses, and these three light emission pulses are all on. As a result of the superimposition of the second light signal on the lighting-on unit, the last light emission pulse in the lighting-on unit is set to be on or off out of the three light emission pulses, while the remaining light emission pulses are all on. This enables to express at least two pieces of bit data.

That is, the light communication signal ("the second light signal") in which the third light emission pulse counted from the head is set to be on or off is superimposed on the minimum lighting-on unit in the first light emitting pattern in which the three light emission pulses are set to be on, thereby generating the second light emitting pattern. In the case where the light communication signal in which the third light emission pulse counted from the head is set to be on is superimposed on the minimum lighting-on unit in the first light emitting pattern in the lighting-on state, the first light emission pulse to the third light emission pulse are all on in the generated second light emitting pattern. In the case where the light communication signal in which the third light emission pulse counted from the head is set to be off is superimposed on the minimum lighting-on unit in the first light emitting pattern in the lighting-on state, the first light emission pulse and the second light emission pulse are set to be on, while the third light emission pulse is set to be off, in the generated second light emitting pattern.

FIG. 4B snows one example of the second light signal in the first light emitting pattern at the time when the light emitting element 120 is in the lighting-off state. In the first light emitting pattern, one lighting-off unit of the light emitting element 120 is configured with three light emission pulses, and these three light emission pulses are all off. As a result of the superimposition of the second light signal on the lighting-off unit, the last light emission pulse in the lighting-off unit is set to be on or off out of the three light emission pulses, and the remaining light emission pulses are all off. This enables to express at least two pieces of bit data.

That is, the light communication signal ("the second light signal") in which the third light emission pulse counted from the head is set to be on or off is superimposed on the minimum lighting-off unit in the first light emitting pattern in which the three light emission pulses are set to be off, thereby generating the second light emitting pattern. In the case where the light communication signal in which the third light emission pulse counted from the head is set to be on is superimposed on the minimum lighting-off unit in the first light emitting pattern in the lighting-off state, the first light emission pulse and the second light emission pulse are set to be off, while the third light emission pulse is set to be on, in the generated second light emitting pattern. In the case where the light communication signal in which the third light emission pulse counted from the head is set to be off is superimposed on the minimum lighting-off unit in the first light emitting pattern in the lighting-off state, the first light emission pulse to the third light emission pulse are all off in the generated second light emitting pattern.

FIG. 4C shows one example of the second light signal, in which after the lighting-on units are provided sequentially in the first light emitting pattern, the lighting-off units are provided sequentially.

In the description above, the second light signal includes three light emission pulses as one set which is the minimum lighting-on unit or the minimum lighting-off unit in the first light emitting pattern, and in each lighting-on unit the first light emission pulse and the second light emission pulse are set to be on and the last light emission pulse is set to be on or off, while in each lighting-off unit the first light emission pulse and the second light emission pulse are set to be off and the last light emission pulse is set to be on or off. The present invention is not limited thereto. Each of the lighting-on unit and the lighting-off unit may be configured with n pieces of light emission pulses, wherein the n is a predetermined integer of 3 or bigger. Further, all the light emission pulses except any one of the light emission pulses included in the lighting-on unit may be on, and only the excepted one light emission pulse may be on or off. Moreover, all the light emission pulses except any one of the light emission pulses included in the lighting-off unit may be off, and only the excepted one light emission pulse may be off or on.

As described above in the first light signal and the second light signal, any piece of data configured with bit data is enabled to be transmitted from the control device 10 to the electronic device 20 by use of the light communication signal.

The transmission data is configured with, for example, a start flag of the transmission data, data type information (for example, text data, audio data, image data, moving video data, etc.), data, and an end flag of the transmission data. The transmission data is transmitted by use of the light communication signal, whereby the control device 10 is able to transmit any piece of data to the electronic device 20.

The next description is about the functional units included in the control unit 100. As described above, the control unit 100 includes the generation unit 101, the modulation unit 102, the superimposition unit 103, the light emitting element control unit 104, and the update unit 105.

The generation unit 101 generates the first light emitting pattern recognizable to human eyes, including the lighting-on state, the lighting-off and the lighting-on/off state of the light emitting element 120 indicating the operating state of the machine tool 30 and/or the peripheral devices thereof, according to the operating state acquired from the machine tool 30 via the interface unit 130. The first light emitting pattern may be specified by a combination of the number of the lighting-on units to be continuously brought into the lighting-on state and the number of the lighting-off units to be continuously brought into the lighting-off state. It is noted that the storage unit 110 may store the correspondence relation between the operating state of the machine tool 30 and/or the peripheral devices thereof and the corresponding first light emitting pattern. Alternatively, the generation unit 101 may store the correspondence relation. In an example, the correspondence relation may be stored in a program which causes the control unit 100 to function as the generation unit 101, out of the control device visible light communication control programs.

The modulation unit 102 selects one out of the detailed information 111a to 111n to be transmitted to an operator on the basis of the information on the normal operating state and the information on the abnormal state of the machine tool 30 and/or the peripheral devices thereof, and performs, on the basis of the selected detailed information, modulation into the light communication signal using the light emission pulses based on the lighting-on/off of the light emitting element 120 unrecognizable to human eyes but recognizable to the electronic device 20. The first light signal or the second light signal described above may be applied as the light communication signal. The modulation unit 102 performs modulation into the light communication signal according to the lighting-on state or the lighting-off state of the first light emitting pattern. That is, in the case where the light emitting element 120 is in the lighting-on state in the first light emitting pattern, the modulation unit 102 performs modulation into the light communication signal corresponding to the lighting-on unit, while in the case where the light emitting element 120 is in the lighting-off state in the first light emitting pattern, the modulation unit 102 performs modulation into the light communication signal corresponding to the light-off unit. Under the state, the light communication signal is superimposed on the first light emitting pattern, thereby enabling to maintain the first light emitting pattern recognizable to human eyes.

The superimposition unit 103 superimposes on the first light emitting pattern the light communication signal modulated by the modulation unit 102 on the basis of the detailed information, thereby generating the second light emitting pattern including the light communication signal while maintaining the first light emitting pattern recognizable to human eyes.

The light emitting element control unit 104 performs modulation control for the light emitting element 120 on the basis of the second light emitting pattern generated by the superimposition unit 103. Specifically, the light emitting element control unit 104 turns on, turns off or blinks the light emitting element 120 on the basis of the second light emitting pattern.

The update unit 105 further adds a new detailed information 111 to the storage unit 110 or updates the detailed information fila to the detailed information 111n stored in the storage unit 110, on the basis of the information acquired via the interface unit 130. The configuration of the control device 10 has been described so far. The next description is about the configuration of the electronic device 20.

Electronic Device

Figure 5:
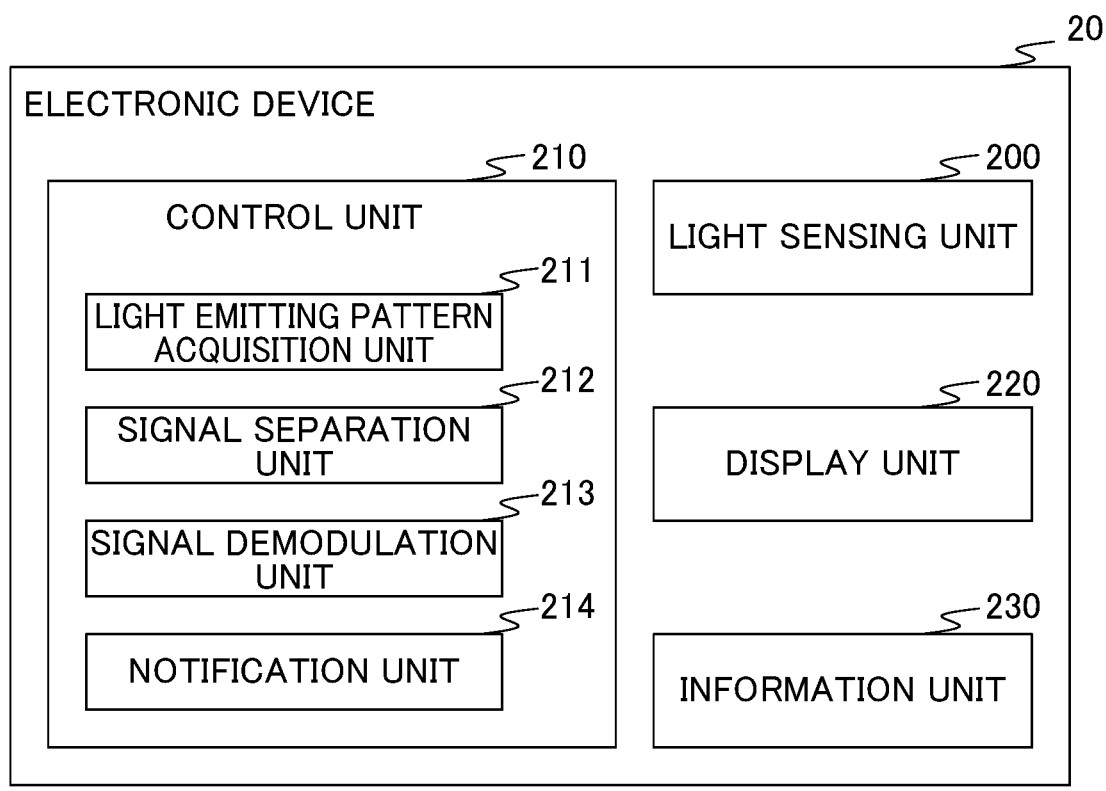
FIG. 5 is a functional block diagram of an electronic device according to the first embodiment of the present invention.

The electronic device 20 is an electronic device including, for example, a mobile terminal such as a smartphone or a mobile phone, a tablet terminal, or a PC. FIG. 5 is a functional block diagram of the electronic device 20. The electronic device 20 includes a light sensing unit 200, a control unit 210, a display unit 220, and an information unit 230.

The light sensing unit 200, which is a device for sensing light emitted by the light emitting element 120 included in the control device 10, is realized by, for example, an image sensor, a photodiode or the like.

The control unit 210, which is a unit for controlling the entire electronic device 20, appropriately reads out various types of programs (collectively referred to as "electronic device visible light communication control programs") from a storage region such as a ROM, a RAM, a flash memory or a hard disk (HDD), and executes the programs, thereby realizing various types of functions in the present embodiment. The control unit 210 may be a CPU. The control unit 210 includes a light emitting pattern acquisition unit 211, a signal separation unit 212, a signal demodulation unit 213, and a notification unit 214.

The light emitting pattern acquisition unit 211 acquires via the light sensing unit 200 the second light emitting pattern output by the control device 10.

The signal separation unit 212 separates the light communication signal from the second light emitting pattern acquired by the light emitting pattern acquisition unit 211. For example, in the case where the light communication signal is the first light signal shown in FIG. 3A to FIG. 3C, the signal separation unit 212 separates the first light signal from the lighting-on unit included in the second light emitting pattern. Alternatively, the signal separation unit 212 separates the first light signal from the lighting-off unit included in the second light emitting pattern. Alternatively, in the case where the light communication signal is the second light signal shown in FIG. 4A to FIG. 4C, the signal separation unit 212 separates the second light signal from the lighting-on unit included in the second light emitting pattern. Alternatively, the signal separation unit 212 separates the second light signal from the lighting-off unit included in the second light emitting pattern.

The signal demodulation unit 213 demodulates the light communication signal separated by the signal separation unit 212, thereby acquiring detailed information to be transmitted to an operator, based on the information on the normal operating state and the information on the abnormal state of the machine tool 30 and/or the peripheral devices thereof.

The notification unit 214 notifies a user of the detailed information acquired by the signal demodulation unit 213. More specifically, the notification unit 214 displays the detailed information via the display unit 220 to be described below, thereby visually notifying a user of the detailed information. Alternatively, the notification unit 214 outputs the detailed information as voice via the information unit 230 to be described below, thereby aurally notifying a user of the detailed information.

It is noted that in the case where the data of the detailed information acquired by the signal demodulation unit 213 is in a bit stream which includes, as described above, data type information positioned at the head and a data sequence of the detailed information itself following the data type information, the notification unit 214 determines, on the basis of the data type information positioned at the head of the detailed information acquired by the signal demodulation unit 213, whether the detailed information following the data type information corresponds to visual information or audio information. In the case of visual information, the notification unit 214 displays the detailed information via the display unit 220. While in the case where the detailed information corresponds to audio information, the notification unit 214 outputs the detailed information as voice via the information unit 230.

Figure 6:
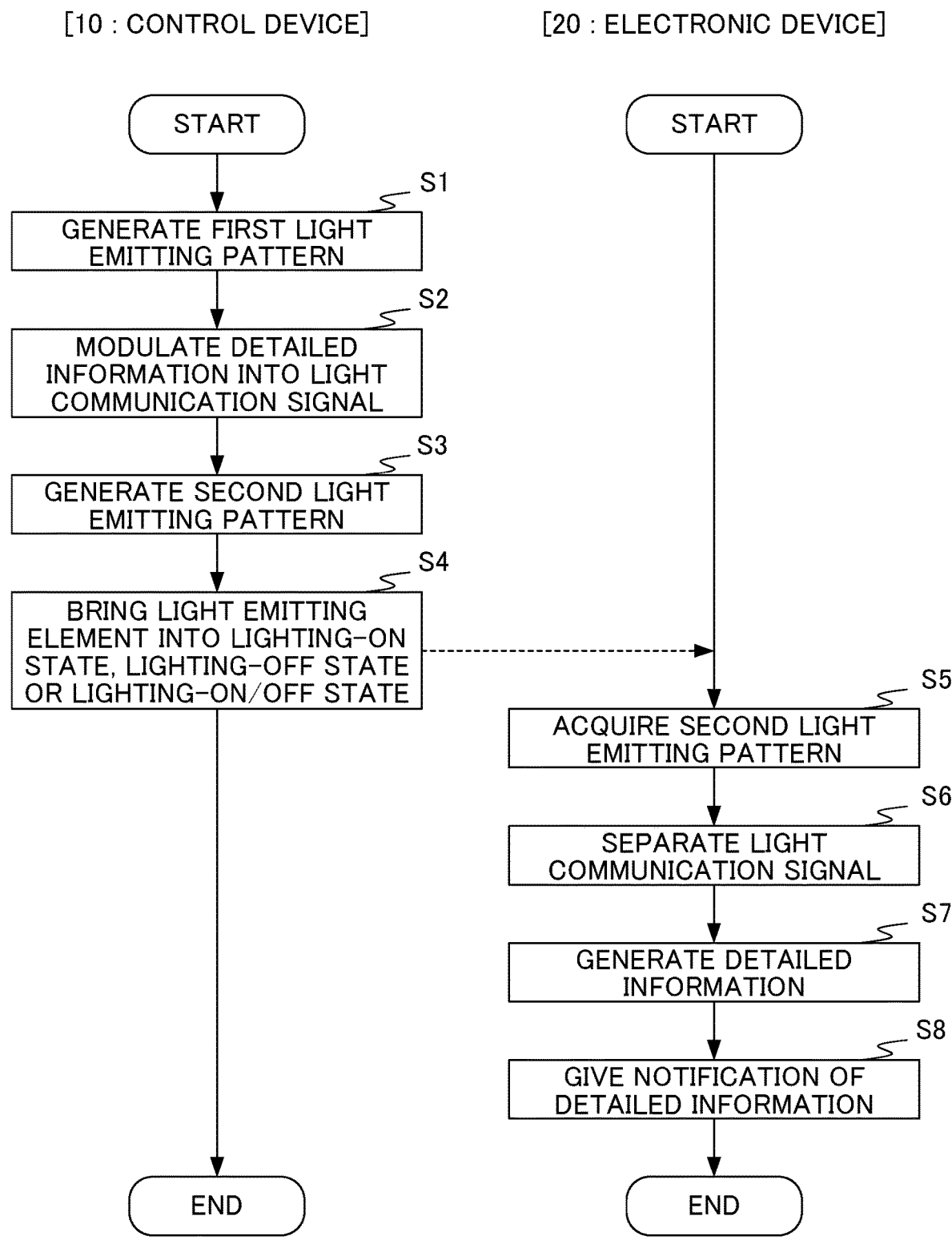
FIG. 6 is a flowchart indicating the operation of the control system according to the first embodiment of the present invention.

The display unit 220 visually displays the detailed information received from the notification unit 214 to a user. The information unit 230 aurally displays the detailed information received from the notification unit 214 to a user. The configuration of the electronic device 20 has been described so far. The next description is about the operation of the control system 1. FIG. 6 is a flowchart indicating the operation of the control system 1.

Operation Flow

The control system 1 executes step S1 to step S8 shown in FIG. 6, thereby notifying a user of the detailed information on the machine tool 30 via the electronic device 20.

With reference to FIG. 6, firstly in step S1, the control device 10 (the generation unit 101) generates, depending on the operating state of the machine tool 30 and/or the peripheral devices thereof acquired from the machine tool 30 via the interface unit 130, the first light emitting pattern which is recognizable to human eyes and includes the lighting-on state, the lighting-off state or the lighting-on/off state of the light emitting element 120 indicating the operating state.

In step S2, the control device 10 (the modulation unit 102) selects one out of the detailed information 111a to 111n to be transmitted to an operator on the basis of the information on the normal operating state and the information on the abnormal state of the machine tool 30 and/or the peripheral devices thereof, and performs, on the basis of the selected detailed information, modulation into the light communication signal using the light emission pulses based on the lighting-on/off of the light emitting element 120 unrecognizable to human eyes but recognizable to the electronic device 20.

In step S3, the control device 10 (the superimposition unit 103) superimposes on the first light emitting pattern the light communication signal modulated by the modulation unit 102 on the basis of the detailed information, thereby generating the second light emitting pattern including the light communication signal while maintaining the first light emitting pattern recognizable to human eyes.

In step S4, the control device 10 (the light emitting element control unit 104) performs modulation control for the light emitting element 120 on the basis of the second light emitting pattern generated by the superimposition unit 103. Specifically, the light emitting element control unit 104 brings the light emitting element 120 into the lighting-on state, the lighting-off state, or lighting-on/off state on the basis of the second light emitting pattern.

In step S5, the electronic device 20 (the light emitting pattern acquisition unit 211) acquires via the light sensing unit 200 the second light emitting pattern output by the control device 10.

In step S6, the electronic device 20 (the signal separation unit 212) separates the light communication signal from the second light emitting pattern acquired by the light emitting pattern acquisition unit 211.

In step S7, the electronic device 20 (the signal demodulation unit 213) demodulates the light communication signal separated by the signal separation unit 212, thereby generating the detailed information to be transmitted to an operator, on the basis of the information on the normal operating state and the information on the abnormal state of the machine tool 30 and/or the peripheral devices thereof.

In step S8, the electronic device 20 (the notification unit 214) notifies a user of the detailed information acquired by the signal demodulation unit 213. More specifically, the electronic device 20 (the notification unit 214) determines, on the basis of the data type information positioned at the head of the detailed information acquired by the signal demodulation unit 213, whether the detailed information following the data type information corresponds to visual information or audio information. In the case of visual information, the notification unit 214 displays the detailed information via the display unit 220. While in the case where the detailed information corresponds to audio information, the notification unit 214 outputs the detailed information as, for example, voice via the information unit 230.

Effects Produced by First Embodiment

The control system 1 according to the first embodiment enables to superimpose the light communication signal corresponding to the detailed information on the first light emitting pattern not only in the lighting-on state but also in the lighting-off state. The control system 1 enables to superimpose the light communication signal corresponding to the detailed information also in the lighting-off state, thereby enabling to transmit data in a shorter time as compared with prior art, and further to efficiently utilize power of the LED.

Second Embodiment

Figure 7:
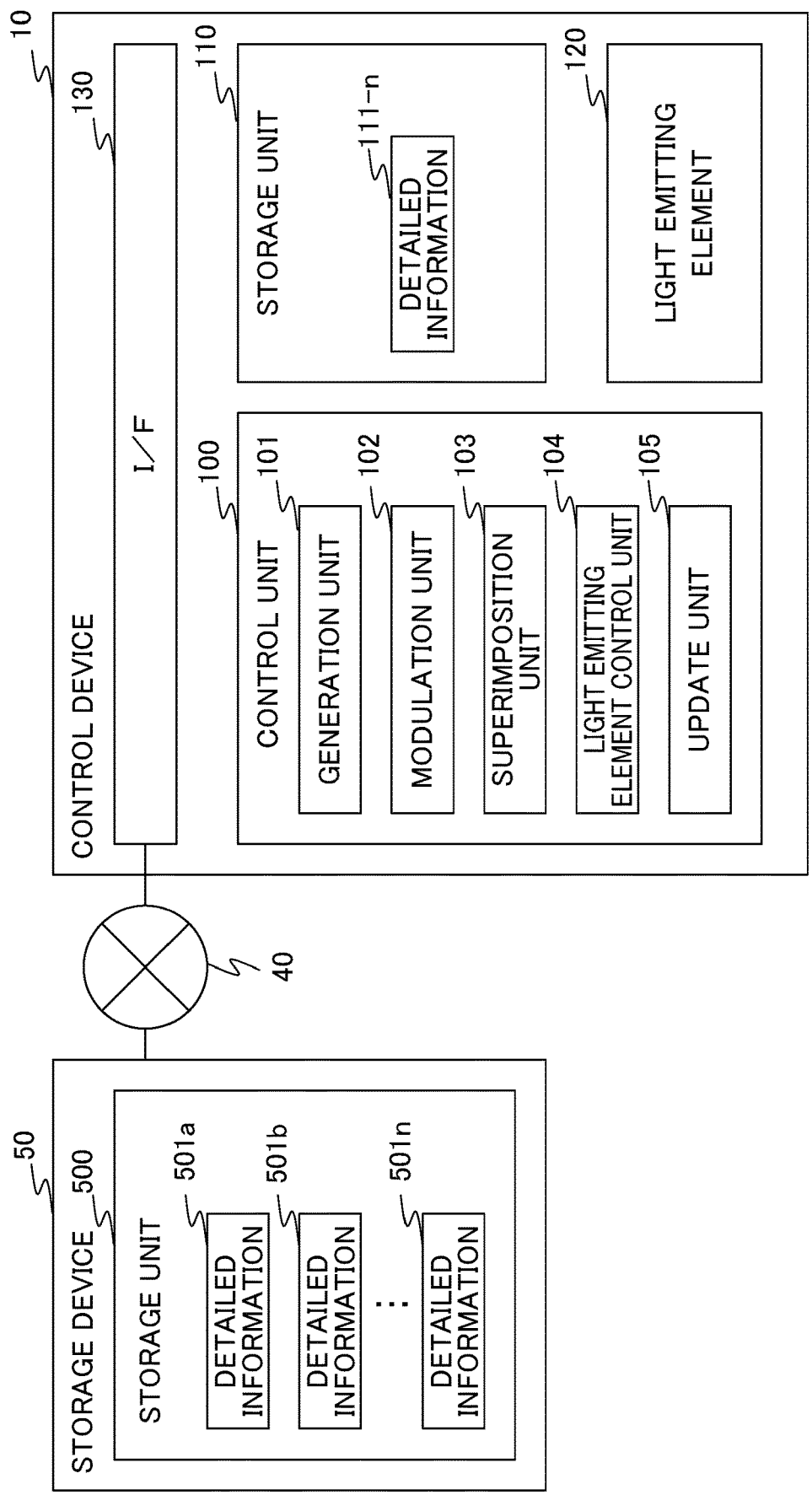
FIG. 7 is a functional block diagram of a control device and a storage device according to a second embodiment of the present invention.

The second embodiment of the present invention will be described in detail with reference to FIG. 7. In the description below, the same reference numerals are used for the same components of a control system 1A according to the second embodiment as those of the control system 1 according to the first embodiment, and the description thereof will be thus omitted. The description below is mainly about the differences between the control system 1A and the control system 1.

The control system 1A according to the second embodiment of the present invention includes the control device 10, the electronic device 20 and the machine tool 30 which are the components of the control system 1, and additionally includes a network 40 and a storage device 50 communicably connected to the control device 10 via the network 40. FIG. 7 shows the control device 10, the network 40 and the storage device 50 out of them.

The storage device 50, which is a file server as an example, includes a storage unit 500. The storage unit 500 stores a detailed information 501a to a detailed information 501n to be transmitted to an operator regarding the normal state or the abnormal state of the machine tool 30 and/or the peripheral devices thereof. It is noted that the storage device 50 may exist on a cloud or a fog.

The update unit 105 of the control device 10 receives a detailed information 501 from the storage device 50 via the interface unit 130, and adds the detailed information 501 to the detailed information 111 stored in the storage unit 110. Alternatively, the update unit 105 updates the detailed information 111 by use of the detailed information 501.

It is noted that the update unit 105 of the control device 10 may acquire the identification information of the machine tool 30 connected to the control device 10, and may receive only the detailed information 501 corresponding to the identification information from the storage device 50.

The update unit 105 may receive the detailed information 501 prior to the machining step performed by the machine tool 30, or may receive the detailed information 501 in each machining step every time when required during the machining by the machine tool 30.

Effects Produced by Second Embodiment

In the control system 1A according to the second embodiment, the control device 10 receives from the external storage device 50 the detailed information 501 required by the machine tool 30. Accordingly, the control device 10 is able to always display the latest detailed information on the electronic device 20. The control system 1A enables to cope with the case of the machine tool 30, for example, a lathe, having a small memory capacity.

Third Embodiment

Figure 8:
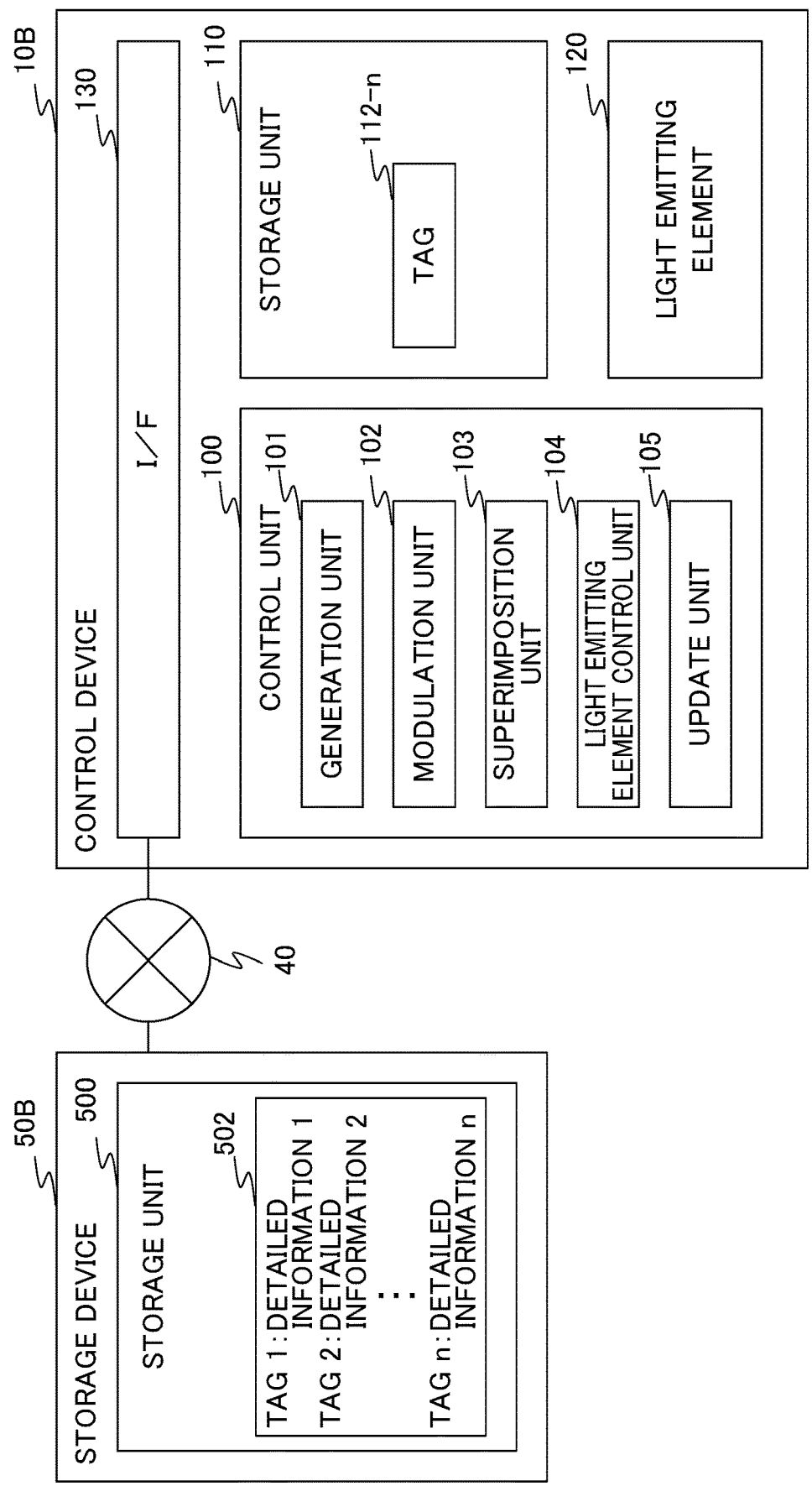
FIG. 8 is a functional block diagram of a control device and a storage device according to a third embodiment of the present invention.

The third embodiment of the present invention will be described in detail with reference to FIG. 8 and FIG. 9. In the description below, the same reference numerals are used for the same components of a control system 1B according to the third embodiment as those of the control system 1A according to the second embodiment, and the description thereof will be thus omitted. The description below is mainly about the differences between the control system 1B and the control system 1A.

The control system 1B according to the third embodiment of the present invention is different from the control system 1A including the control device 10, the electronic device 20, the machine tool 30, the network 40 and the storage device 50, in that the control system 1B includes a control device 10B instead of the control device 10, an electronic device 20B instead of the electronic device 20, and a storage device 50B instead of the storage device 50. FIG. 8 is a functional block diagram of the control device 10B, the network 40 and the storage device 50B out of them.

The storage unit 500 of the storage device 50 according to the second embodiment stores the detailed information 501 on the machine tool 30. On the other hand, the storage unit 500 of the storage device 50B according to the third embodiment stores a correspondence relation information 502 on the relation between the detailed information on the machine tool 30 and a tag corresponding to each piece of the detailed information. It is noted that the tag may be represented by an identification code for identifying detailed information.

The storage unit 110 of the control device 10 according to the second embodiment stores the detailed information 111. On the other hand, the storage unit 110 of the control device 10B according to the third embodiment stores a tag 112 instead of the detailed information 111.

The update unit 105 of the control device 10B receives a tag from the storage device 50B via the interface unit 130, and adds the tag to the storage unit 110. Alternatively, the update unit 105 updates the tag 112 stored in the storage unit 110 by use of the tag.

The modulation unit 102 selects the tag 112 corresponding to the detailed information to be transmitted to an operator, on the basis of the information on the normal operating state and the information on the abnormal state of the machine tool 30 and/or the peripheral devices thereof, and performs, on the basis of the selected tag, modulation into the light communication signal using the light emission pulses based on the lighting-on/off of the light emitting element 120 unrecognizable to human eyes but recognizable to the electronic device 20B.

The superimposition unit 103 superimposes on the first light emitting pattern the light communication signal modulated by the modulation unit 102 on the basis of the tag, thereby generating the second light emitting pattern including the light communication signal while maintaining the first light emitting pattern recognizable to human eyes.

The light emitting element control unit 104 performs modulation control for the light emitting element 120 on the basis of the second light emitting pattern generated by the superimposition unit 103. Specifically, the light emitting element control unit 104 brings the light emitting element 120 into the lighting-on state, the lighting-off state or the lighting-on/off state on the basis of the second light emitting pattern.

Figure 9:
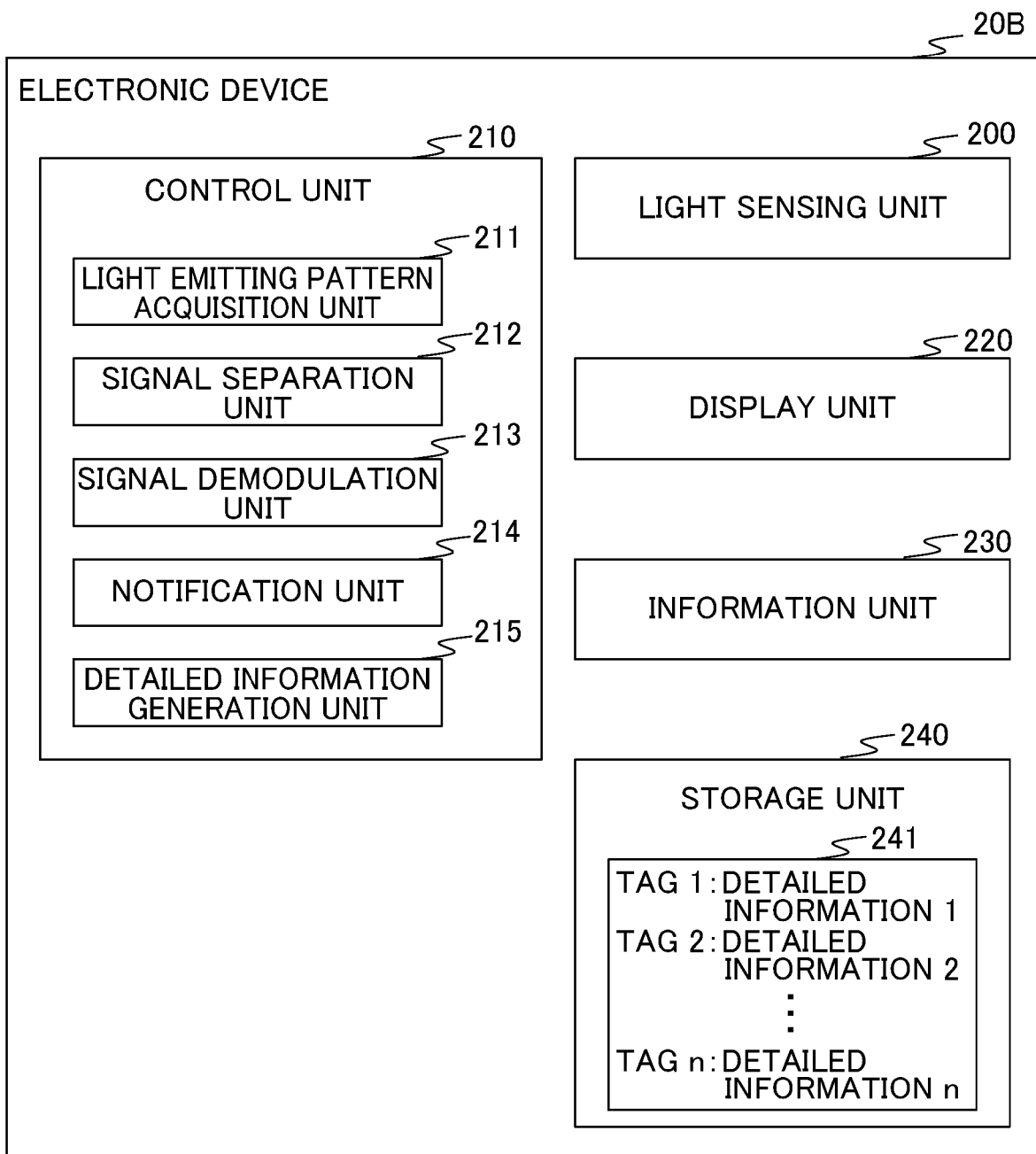
FIG. 9 is a functional block diagram of an electronic device according to the third embodiment of the present invention.
Figure 10:
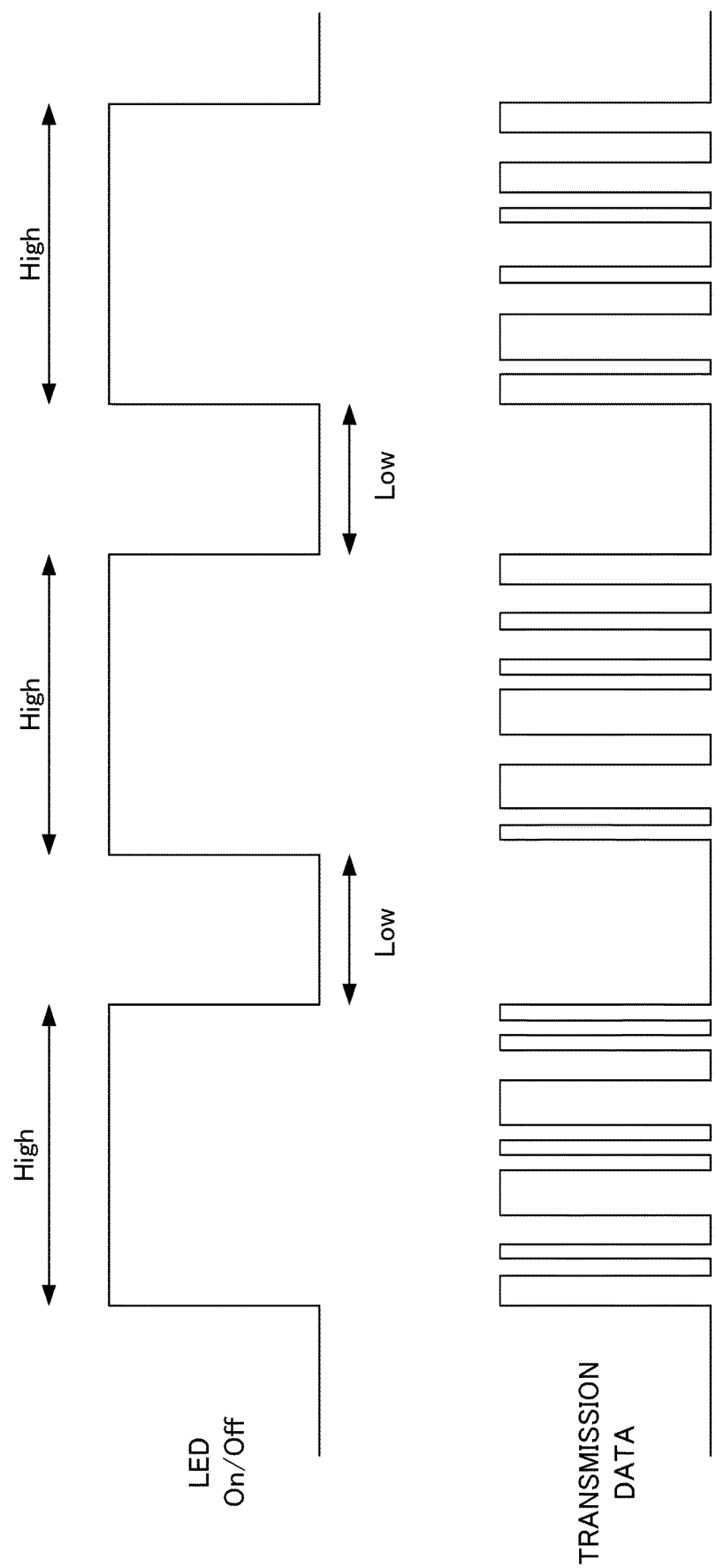
FIG. 10 is a diagram illustrating a light emitting pattern of an LED in a conventional example.

FIG. 9 is a functional block diagram of the electronic device 20B. The electronic device 20B includes the light sensing unit 200, the control unit 210, the display unit 220 and the information unit 230, and additionally includes a storage unit 240. The control unit 210 includes the light emitting pattern acquisition unit 211, the signal separation unit 212, the signal demodulation unit 213 and the notification unit 214, and additionally includes a detailed information generation unit 215.

The storage unit 240 stores a correspondence relation information 241 on the relation between the detailed information on the machine tool 30 and a tag corresponding to each piece of the detailed information.

The signal demodulation unit 213 demodulates the light communication signal separated by the signal separation unit 212, thereby acquiring the tag corresponding to the detailed information to be transmitted to an operator, based on the information on the normal operating state and the information on the abnormal state of the machine tool 30 and/or the peripheral devices thereof.

The detailed information generation unit 215 generates the detailed information to be transmitted to an operator, based on the information on the normal operating state and the information on the abnormal state of the machine tool 30 and/or the peripheral devices thereof, by using the correspondence relation information 241 to the tag acquired by the signal demodulation unit 213.

The notification unit 214 notifies a user of the detailed information generated by the detailed information generation unit 215. More specifically, the notification unit 214 displays the detailed information via the display unit 220, thereby visually notifying a user of the detailed information. Alternatively, the notification unit 214 outputs the detailed information as voice via the information unit 230, thereby aurally notifying a user of the detailed information.

Effects Produced by Third Embodiment

In the control system 1B according to the third embodiment, the control device 10 receives from the external storage device 50 the tag corresponding to the detailed information required by the machine tool 30, and stores the tag in the storage unit 110. This enables to reduce the communication capacity between the control device 10B and the storage device 50B, and the storage capacity of the storage unit 110, as compared with the first embodiment and the second embodiment, and further enables to shorten the length of the light communication signal.

Modification

In each of the control systems 1, 1A, 1B, the modulation unit 102 of the control device 10 performs, on the basis of the information on the normal operating state and the information on the abnormal state of the machine tool 30 and/or the peripheral devices thereof, modulation into the light communication signal using the light emission pulses based on the lighting-on/off of the light emitting element 120 unrecognizable to human eyes but recognizable to the electronic device 20. At this time, the modulation unit 102 may change a modulation method according to the notification method by which the notification unit 214 of the electronic device 20 notifies a user of the detailed information. More specifically, the notification unit 214 of the electronic device 20 determines whether the detailed information to be displayed via the display unit 220 is text data or an image, or whether or not the detailed information to be output via the information unit 230 is voice, and the modulation unit 102 of the control device 10 may accordingly change the modulation method.

Although the embodiments of the present invention have been described so far, the present invention is not limited to the above-described embodiments. The effects described in the present embodiments are listed merely as the most preferable effects produced by the present invention, and the effects produced by the present invention are not limited to those described in the present embodiments.

The control method performed by the control devices 10, 10B is realized by software. In the case where the method is realized by software, the programs included in the software are installed in a computer (the control devices 10, 10B). The programs may be stored in a removable medium for distribution to a user, or may be downloaded to user's computer via a network for distribution. Such programs may be provided to user's computer (the control devices 10, 10B) as Web service via a network without being downloaded.

EXPLANATION OF REFERENCE NUMERALS 1, 1A, 1B CONTROL SYSTEM
10, 10B CONTROL DEVICE
20, 20B ELECTRONIC DEVICE
30 MACHINE TOOL
50, 50B STORAGE DEVICE
100 CONTROL UNIT
101 GENERATION UNIT
102 MODULATION UNIT
103 SUPERIMPOSITION UNIT
104 LIGHT EMITTING ELEMENT CONTROL UNIT
105 UPDATE UNIT
110 STORAGE UNIT
120 LIGHT EMITTING ELEMENT
130 INTERFACE UNIT
200 LIGHT SENSING UNIT
210 CONTROL UNIT
211 LIGHT EMITTING PATTERN ACQUISITION UNIT
212 SIGNAL SEPARATION UNIT
213 SIGNAL DEMODULATION UNIT
214 NOTIFICATION UNIT
215 DETAILED INFORMATION GENERATION UNIT
240 STORAGE UNIT

What is claimed is:

1. A control device configured to control at least one of a machine tool and a peripheral device of the machine tool, the control device comprising:
   a storage unit;
   a control unit; and
   a light emitting element,
   the storage unit storing
      a first information on at least one of the machine tool and the peripheral device of the machine tool,
   the control unit including:
      a generation unit configured to generate a first light emitting pattern recognizable to human eyes, the first light emitting pattern including a lighting-on state, a lighting-off state, or a lighting-on-and-off state of the light emitting element indicating an operating state of at least one of the machine tool and the peripheral device of the machine tool;
      a modulation unit configured to modulate the first information into a light communication signal based on lighting-on-and-off of the light emitting element, the light communication signal being unrecognizable to human eyes but recognizable to an electronic device;
      a superimposition unit configured to superimpose the light communication signal on the first light emitting pattern, to generate a second light emitting pattern including the light communication signal while maintaining the first light emitting pattern recognizable to human eyes; and
      a light emitting element control unit configured to control the light emitting element on a basis of the second light emitting pattern generated by the superimposition unit, wherein
      each of a lighting-on unit and a lighting-off unit of the light emitting element in the first light emitting pattern is configured with n pieces of light emission pulses, and the n is a predetermined integer of 8 or bigger, and wherein
   in the light communication signal,
      when the light emitting element is in the lighting-on state including at least one lighting-on unit in the first light emitting pattern, first m pieces and last m pieces of the light emission pulses are set to be on in the lighting-on unit, remaining light emission pulses except one light emission pulse are all set to be on, and only the excepted one light emission pulse is set to be off, wherein the m is an integer of 2 or bigger, and
      when the light emitting element is in the lighting-off state including at least one lighting-off unit in the first light emitting pattern, the first m pieces and the last m pieces of the light emission pulses are set to be off in the lighting-off unit, the remaining light emission pulses except one light emission pulse are all set to be off, and only the excepted one light emission pulse is set to be on.

2. The control device according to claim 1, the control device including an external interface, wherein
   the control unit further includes an update unit configured to perform at least one of addition and updating of the first information stored in the storage unit, on a basis of information received via the external interface.

3. The control device according to claim 2, wherein
   the external interface receives the information from an external storage device existing on a cloud or a fog.

4. The control device according to claim 1, wherein
   the first information is detailed information on the state of at least one of the machine tool and the peripheral device of the machine tool, and includes at least one of alarm information, a countermeasure and a manual.

5. An electronic device comprising:
a light sensing unit;
and a control unit, wherein
the control unit includes:
a light emitting pattern acquisition unit configured to acquire the second light emitting pattern output by the control device according to claim 1, via the light sensing unit;
a signal separation unit configured to separate the light communication signal from the second light emitting pattern acquired by the light emitting pattern acquisition unit;
a signal demodulation unit configured to demodulate the light communication signal, to generate the first information; and
a notification unit configured to notify a user of the first information.

6. A control system comprising:
a control device configured to control at least one of a machine tool and a peripheral device of the machine tool, the control device comprising:
a storage unit;
a control unit; and
a light emitting element,
the storage unit storing
a first information on at least one of the machine tool and the peripheral device of the machine tool,
the control unit including:
a generation unit configured to generate a first light emitting pattern recognizable to human eyes, the first light emitting pattern including a lighting-on state, a lighting-off state, or a lighting-on-and-off state of the light emitting element indicating an operating state of at least one of the machine tool and the peripheral device of the machine tool;
a modulation unit configured to modulate the first information into a light communication signal based on lighting-on-and-off of the light emitting element, the light communication signal being unrecognizable to human eyes but recognizable to an electronic device;
a superimposition unit configured to superimpose the light communication signal on the first light emitting pattern, to generate a second light emitting pattern including the light communication signal while maintaining the first light emitting pattern recognizable to human eyes; and
a light emitting element control unit configured to control the light emitting element on a basis of the second light emitting pattern generated by the superimposition unit; and
the electronic device according to claim 5.

7. The control system according to claim 6, wherein
the modulation unit included in the control device converts the first information into the light communication signal according to a notification method performed by the notification unit included in the electronic device.

8. The control device according to claim 1, wherein
the first information is a tag,
the tag is identification data corresponding to detailed information on the state of at least one of the machine tool and the peripheral device of the machine tool, and
the detailed information includes at least one of alarm information, a countermeasure and a manual.

9. An electronic device comprising:
a light sensing unit;
a control unit; and
a storage unit,
the storage unit storing correspondence relation between detailed information on a state of at least one of a machine tool and a peripheral device of the machine tool and a tag corresponding to the detailed information,
the control unit including:
a light emitting pattern acquisition unit configured to acquire the second light emitting pattern output by the control device according to claim 8, via the light sensing unit;
a signal separation unit configured to separate the light communication signal from the second light emitting pattern acquired by the light emitting pattern acquisition unit;
a signal demodulation unit configured to demodulate the light communication signal to generate the first information;
a detailed information generation unit configured to generate the detailed information for the tag serving as the first information, by use of the correspondence relation; and
a notification unit configured to notify a user of the detailed information.

10. A control system comprising:
a control device configured to control at least one of a machine tool and a peripheral device of the machine tool, the control device comprising:
a storage unit;
a control unit; and
a light emitting element,
the storage unit storing
a first information on at least one of the machine tool and the peripheral device of the machine tool,
the control unit including:
a generation unit configured to generate a first light emitting pattern recognizable to human eyes, the first light emitting pattern including a lighting-on state, a lighting-off state, or a lighting-on-and-off state of the light emitting element indicating an operating state of at least one of the machine tool and the peripheral device of the machine tool;
a modulation unit configured to modulate the first information into a light communication signal based on lighting-on-and-off of the light emitting element, the light communication signal being unrecognizable to human eyes but recognizable to an electronic device;
a superimposition unit configured to superimpose the light communication signal on the first light emitting pattern, to generate a second light emitting pattern including the light communication signal while maintaining the first light emitting pattern recognizable to human eyes; and
a light emitting element control unit configured to control the light emitting element on a basis of the second light emitting pattern generated by the superimposition unit,
wherein the first information is a tag,
the tag is identification data corresponding to detailed information on the state of at least one of the machine tool and the peripheral device of the machine tool, and
the detailed information includes at least one of alarm information, a countermeasure and a manual; and
the electronic device according to claim 9.

11. A control device configured to control at least one of a machine tool and a peripheral device of the machine tool, the control device comprising:
- a storage unit;
- a control unit; and
- a light emitting element, the storage unit storing
- a first information on at least one of the machine tool and the peripheral device of the machine tool, the control unit including:
- a generation unit configured to generate a first light emitting pattern recognizable to human eyes, the first light emitting pattern including a lighting-on state, a lighting-off state, or a lighting-on-and-off state of the light emitting element indicating an operating state of at least one of the machine tool and the peripheral device of the machine tool;
- a modulation unit configured to modulate the first information into a light communication signal based on lighting-on-and-off of the light emitting element, the light communication signal being unrecognizable to human eyes but recognizable to an electronic device;
- a superimposition unit configured to superimpose the light communication signal on the first light emitting pattern, to generate a second light emitting pattern including the light communication signal while maintaining the first light emitting pattern recognizable to human eyes; and
- a light emitting element control unit configured to control the light emitting element on a basis of the second light emitting pattern generated by the superimposition unit, wherein each of a lighting-on unit and a lighting-off unit of the light emitting element in the first light emitting pattern is configured with n pieces of light emission pulses, and the n is a predetermined integer of 3 or bigger, and wherein in the light communication signal,
- when the light emitting element is in the lighting-on state including at least one lighting-on unit in the first light emitting pattern, the light emission pulses except one light emission pulse included in the lighting-on unit are all set to be on, and only the excepted one light emission pulse is set to be off or on, and
- when the light emitting element is in the lighting-off state including at least one lighting-off unit in the first light emitting pattern, the light emission pulses except one light emission pulse included in the lighting-off unit are all set to be off, and only the excepted one light emission pulse is set to be on or off.

12. The control device according to claim 11, the control device including an external interface, wherein
the control unit further includes an update unit configured to perform at least one of addition and updating of the first information stored in the storage unit, on a basis of information received via the external interface.

13. The control device according to claim 12, wherein the external interface receives the information from an external storage device existing on a cloud or a fog.

14. The control device according to claim 11, wherein the first information is detailed information on the state of at least one of the machine tool and the peripheral device of the machine tool, and includes at least one of alarm information, a countermeasure and a manual.

15. An electronic device comprising:
- a light sensing unit;
- and a control unit, wherein the control unit includes:
- a light emitting pattern acquisition unit configured to acquire the second light emitting pattern output by the control device according to claim 11, via the light sensing unit;
- a signal separation unit configured to separate the light communication signal from the second light emitting pattern acquired by the light emitting pattern acquisition unit;
- a signal demodulation unit configured to demodulate the light communication signal, to generate the first information; and
- a notification unit configured to notify a user of the first information.

16. A control system comprising:
- a control device configured to control at least one of a machine tool and a peripheral device of the machine tool, the control device comprising:
  - a storage unit;
  - a control unit; and
  - a light emitting element, the storage unit storing
  - a first information on at least one of the machine tool and the peripheral device of the machine tool, the control unit including:
  - a generation unit configured to generate a first light emitting pattern recognizable to human eyes, the first light emitting pattern including a lighting-on state, a lighting-off state, or a lighting-on-and-off state of the light emitting element indicating an operating state of at least one of the machine tool and the peripheral device of the machine tool;
  - a modulation unit configured to modulate the first information into a light communication signal based on lighting-on-and-off of the light emitting element, the light communication signal being unrecognizable to human eyes but recognizable to an electronic device;
  - a superimposition unit configured to superimpose the light communication signal on the first light emitting pattern, to generate a second light emitting pattern including the light communication signal while maintaining the first light emitting pattern recognizable to human eyes; and
  - a light emitting element control unit configured to control the light emitting element on a basis of the second light emitting pattern generated by the superimposition unit; and the electronic device according to claim 15.

17. The control system according to claim 16, wherein the modulation unit included in the control device converts the first information into the light communication signal according to a notification method performed by the notification unit included in the electronic device.

18. The control device according to claim 11, wherein the first information is a tag,
the tag is identification data corresponding to detailed information on the state of at least one of the machine tool and the peripheral device of the machine tool, and the detailed information includes at least one of alarm information, a countermeasure and a manual.

19. An electronic device comprising:
- a light sensing unit;
- a control unit; and
- a storage unit, the storage unit storing correspondence relation between detailed information on a state of at least one of a machine tool and a peripheral device of the machine tool and a tag corresponding to the detailed information, the control unit including:
a light emitting pattern acquisition unit configured to acquire the second light emitting pattern output by the control device according to claim 18, via the light sensing unit;
a signal separation unit configured to separate the light communication signal from the second light emitting pattern acquired by the light emitting pattern acquisition unit;
a signal demodulation unit configured to demodulate the light communication signal to generate the first information;
a detailed information generation unit configured to generate the detailed information for the tag serving as the first information, by use of the correspondence relation; and
a notification unit configured to notify a user of the detailed information.

20. A control system comprising:
a control device configured to control at least one of a machine tool and a peripheral device of the machine tool, the control device comprising:
   a storage unit;
   a control unit; and
   a light emitting element,
the storage unit storing
   a first information on at least one of the machine tool and the peripheral device of the machine tool,
the control unit including:
   a generation unit configured to generate a first light emitting pattern recognizable to human eyes, the first light emitting pattern including a lighting-on state, a lighting-off state, or a lighting-on-and-off state of the light emitting element indicating an operating state of at least one of the machine tool and the peripheral device of the machine tool;
   a modulation unit configured to modulate the first information into a light communication signal based on lighting-on-and-off of the light emitting element, the light communication signal being unrecognizable to human eyes but recognizable to an electronic device;
   a superimposition unit configured to superimpose the light communication signal on the first light emitting pattern, to generate a second light emitting pattern including the light communication signal while maintaining the first light emitting pattern recognizable to human eyes; and
   a light emitting element control unit configured to control the light emitting element on a basis of the second light emitting pattern generated by the superimposition unit,
wherein the first information is a tag,
the tag is identification data corresponding to detailed information on the state of at least one of the machine tool and the peripheral device of the machine tool, and
the detailed information includes at least one of alarm information, a countermeasure and a manual; and
the electronic device according to claim 19.

* * * * *